United States Patent [19]

Dooley

[11] 4,006,847
[45] Feb. 8, 1977

[54] DISPENSING APPARATUS

[75] Inventor: Dan W. Dooley, Lake Oswego, Oreg.

[73] Assignee: Dooley Dynamics, Inc., Portland, Oreg.

[22] Filed: Oct. 23, 1975

[21] Appl. No.: 625,081

[52] U.S. Cl. .............................. 222/263; 222/309; 222/334; 222/335
[51] Int. Cl.² .......................................... G01F 11/00
[58] Field of Search .......... 222/335, 309, 334, 263, 222/249, 250

[56] References Cited

UNITED STATES PATENTS

| 1,769,499 | 7/1930 | Du Puy | 222/335 |
| 1,830,697 | 11/1931 | Hartman | 222/263 X |

FOREIGN PATENTS OR APPLICATIONS

| 311,858 | 5/1929 | United Kingdom | 222/335 |

Primary Examiner—Stanley H. Tollberg
Assistant Examiner—Hadd Lane
Attorney, Agent, or Firm—Klarquist, Sparkman, Campbell, Leigh, Hall & Whinston

[57] ABSTRACT

A dispensing apparatus for viscous substances includes a unitary plastic block housing provided with a vertical bore forming a dispensing cylinder and a horizontal three way spool valve operable for controlling a dispensing piston located in the aforementioned dispensing cylinder. The dispensing piston is attached to a shaft extending centrally upwardly of the dispensing cylinder and is adjustable for controlling the stroke of the dispensing piston and thereby the quantity of material dispensed. A common source of air pressure is applied to the minor area on the shaft side of the dispensing piston as well as to the material to be dispensed. The material under pressure is normally applied to the major side of the dispensing piston via the spool valve. When the spool valve is operated the supply of material is cut off and the dispensing cylinder is connected to an exit port, whereby the air pressure behind the dispensing piston is sufficient to force a predetermined quantity of material through the exit port.

12 Claims, 2 Drawing Figures

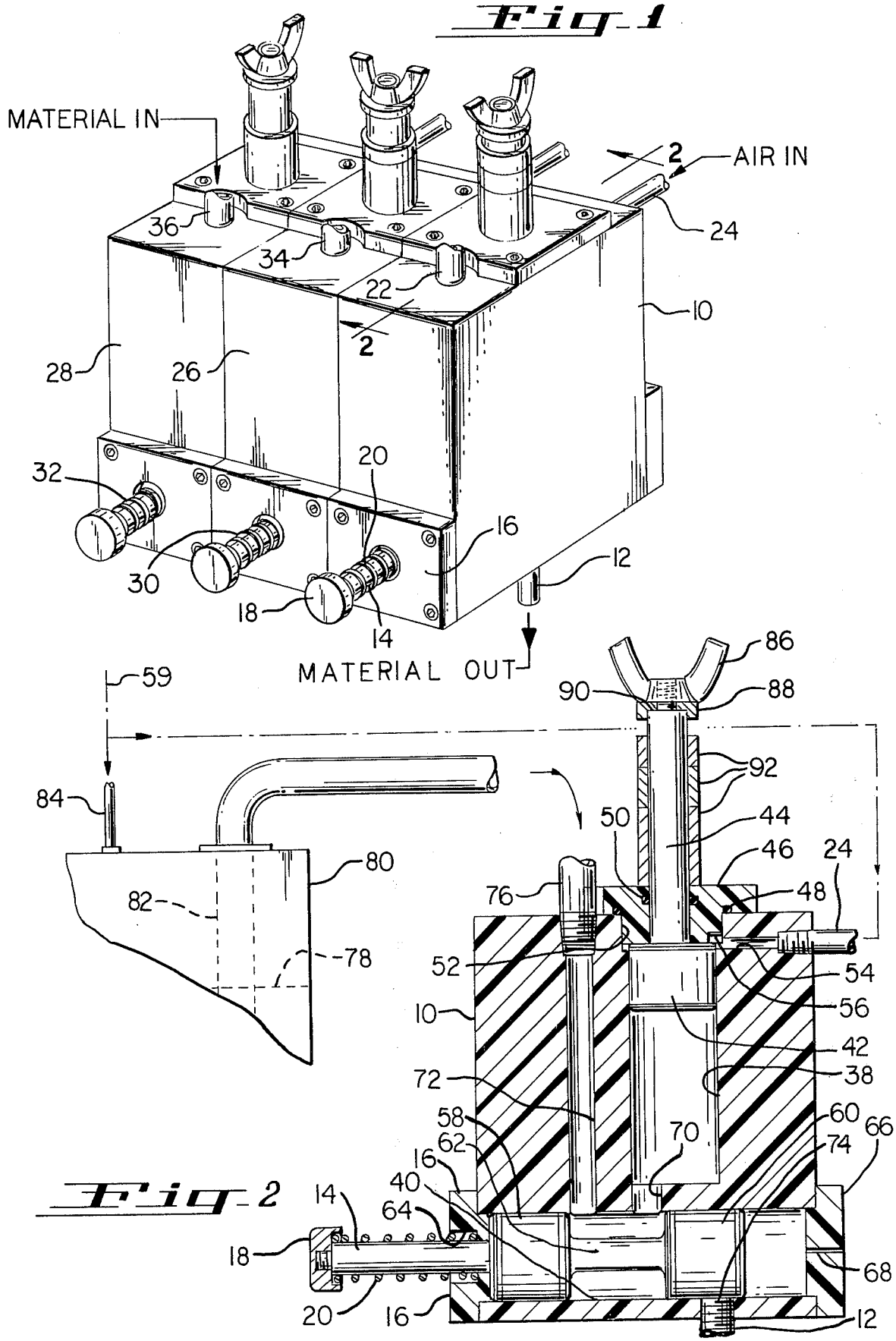

DISPENSING APPARATUS

BACKGROUND OF THE INVENTION

Conventional dispensing systems for liquids generally comprise a pressurized supply and a dispensing valve which is open for a predetermined period of time such that a predetermined quantity of liquid is delivered therethrough. While systems of this type are suitable for many purposes, they are not entirely suitable for viscous substances such as syrups, custards, jellies, or materials which contain semi-solid elements. The quantity of substance which may flow in a given time may vary, and shut off of the dispensing valve may be difficult.

In my prior U.S. Pat. No. 3,734,352 a dispensing system is disclosed and claimed including a dispensing cylinder and a pilot operated spool valve for controlling the dispensing cylinder. This system is efficacious in solving the problems associated with viscous substances in that positive displacement of a definite quantity of material is provided together with quick severing of semi-solid elements in the dispensed material through action of the spool valve. The present invention comprises an additional improvement in this type of apparatus wherein the control and dispensing elements are provided in a unitary block adapted for multiple utilization with other similar units. The apparatus is simplified but requires a single source of air under pressure for operation, while also providing for external adjustment of the quantity of material dispensed.

SUMMARY OF THE INVENTION

According to the present invention dispensing apparatus includes a dispensing cylinder having a dispensing piston received therewithin having differing end areas in said bore. A spool valve for operating the dispensing piston includes a central port connected to the dispensing end of the dispensing cylinder, and end ports respectively communicating with a source of material to be dispensed and a dispensing exit port. A source of air under pressure is directed to the smaller or minor area behind the dispensing piston, as well as to the material to be dispensed. In the normal position of the spool valve, material is delivered therethrough to the dispensing cylinder adjacent the major or larger end area of the dispensing piston, but when the spool valve is operated to a second position, the air pressure applied behind the minor end area of the dispensing piston forces the material through the spool valve to the exit port.

Preferably, the dispensing cylinder and the spool valve comprise first and second bores in a common unitary housing block adapted for convenient mounting in a restaurant, soda fountain or the like adjacent other similar units. Also, the unit preferably includes a shaft extension on said dispensing piston, whereby to reduce the adjacent piston end area to a "minor" area, and means cooperable with this extension for externally adjusting the stroke of the dispensing piston and therefore of the quantity of material to be delivered.

It is therefore an object of the present invention to provide an improved dispensing apparatus for dispensing a predetermined quantity of a viscous or non-uniform substance.

It is a further object of the present invention to provide an improved dispensing apparatus for viscous or non-uniform substances, which apparatus is simple, economical and compact in construction.

It is a further object of the present invention to provide an improved dispensing apparatus for dispensing a predetermined quantity of a viscous or non-uniform substance, wherein said apparatus is externally adjustable for regulating the quantity of material to be dispensed.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a perspective view of plural dispensing units according to the present invention; and FIG. 2 is a vertical, cross sectional view of dispensing apparatus according to the present invention.

DETAILED DESCRIPTION

Referring to the drawings, and particularly to FIG. 1, a plurality of dispensing devices according to the present invention are illustrated in perspective view, one, for example, comprising a housing block 10, suitably formed of plastic material with an exit port 12 extending from the underside thereof for the dispensing of material. The apparatus further includes a dispensing handle shaft 14 protruding horizontally through a stop 16 secured to the lower front area of the block 10, the forward end of the operating shaft having an operating button 18. Around the shaft 14 between button 18 and an inner recess in stop 16 there is provided a spring 20 which tends to hold the operating shaft in its outward or non-operated position. Inward depression of the operating shaft produces the dispensing of a predetermined amount of material in a manner hereinafter more fully described.

Material to be dispensed is coupled into the top of block 10 via tubing 22, while tube 24 is an inlet for air under pressure which operates a dispensing piston causing the immediate expulsion of the desired quantity of material.

As is seen in FIG. 1, further dispensing devices 26 and 28 are desirably mounted adjacent the first described dispensing device. These further devices are substantially identical with the first described device and include adjacent operating handles 30 and 32 respectively. Inlet tubes 34 and 36 are suitably connected to sources of other material to be dispensed, for example various flavors of syrup, topping, relish or the like wherein the combination of dispensing devices is advantageously mounted in array in a restaurant, soda fountain or the like.

Referring to FIG. 2, illustrating the apparatus in greater detail, the block 10 is provided with a pair of bores in substantially right angular relation, comprising a first vertical bore 38 forming a first dispensing cylinder and a second horizontal bore 40 thereunder forming a second cylinder parallel to the bottom of the block 10. A first dispensing piston 42, suitably formed of plastic, is received in bore 38 and is attached to a central shaft 44 extending centrally, vertically upwardly and outwardly of bore 38 through a sealing gland 46. The sealing gland is provided with sealing rings 48 and 50 adjoining block 10 and shaft 44 respectively and is securely received in enlarged outer end 52 of bore 38. A passage 54 connects tube 24 to the area of the upper side of piston 42 by way of a recess 56 in the under side of sealing gland 46. By this means, air under pressure from a source indicated by dashed lines 59 is applied to the upper side of piston 42 tending to force the same downwardly.

Within second bore 40 is received a three way valve including inner and outer lands 58 and 60 joined by a central shaft 62 having a diameter less than half the diameter of the lands and bore 40. A further operating shaft 14 extends centrally outwardly of bore 40 through a central aperture in stop 16 which is secured into the end of bore 40. As hereinbefore described, the shaft 14 is supplied at its outwardmost end with an operating button 18 suitably threadably secured on the end of the shaft, while spring 20 is disposed around shaft 14 between the button and recess 64 in stop 16. The opposite end of bore 40 is suitably provided with a second stop 66 closing off the end of the bore except for an air outlet 68 through which air may escape from behind land 60.

The three way spool valve is further provided with a central circular port 70 communicating from the bottom end of bore 38 to a central location in the side of bore 40 between lands 58 and 60. First and second circular end ports 72 and 74 are respectively disposed on either side of central port 70 by less than the distance between the spool lands whereby the spool valve in the nonoperated position shown permits communication between ports 70 and 72, while in the depressed or operated position the same provides communication between ports 70 and 74. As can be seen, port 74 comprises the inner end of exit port 12. Port 72 communicates with tubing 76 through which material 78 is delivered from storage tank 80 wherein inner portion 82 of tube 76 extends below the surface of material 78. Pressure source 59 is also connected to the interior of tank 80 above the surface of material 78 via tubing 84.

The upper end of central shaft 44 includes a stop suitably comprising a wing nut 86 received on an upper threaded end of shaft 44 with a washer stop 88 disposed between shoulder 90 of shaft 44 and the wing nut. Around shaft 44 are received a plurality of sleeves 92 which may have varying vertical thicknesses and which are used for adjusting the stroke of dispensing piston 42. That is, one or more of said sleeves may be placed upon or removed from shaft 44 with wing nut 86 and washer 88 removed, after which the wing nut and washer are replaced whereby downward movement of the piston 42 and shaft 44 is arrested when washer 88 contacts the top-most sleeve 92, thereby determining the stroke of said piston. It is noted a lesser number of sleeves is utilized for device 26 in FIG. 1, and only one in the case of device 28. The maximum piston stroke is provided with all sleeves removed.

Both pistons 42 and lands 58, 60 are preferably sealed using integral lip seals, wherein the outermost end perimeters of the cylinders are turned outwardly for contacting the inside walls of the bores 38 and 40, the pistons being formed of plastic. However, the seals may also comprise O rings, U cups, continuous ring gaskets or the like. The size of the ports 70, 72 and 74 is desirably large enough to accommodate fairly heavy material which it may be desired to dispense such as materials containing semi-solid items in mixture. Thus, the diameter of the ports is desirably approximately equal to the difference in diameter between central shaft 62 and lands 58, 60. A suitable diameter is at least approximately three-eighths inch. The lands 58 and 60 operate to sever chunky portions of the dispensed material when the three way spool valve is operated.

Further considering the operation of the present device, in the position shown in FIG. 2, pressure from tubing 84 forces material 78 in tank 80 through tube 76, port 72 and around shaft 62 to port 70 and into bore 38. Material enters bore 38 with sufficient force on the major under area of piston 42 to force the piston to the far end of the cylinder against the stop provided by sealing gland 46. The bore 38 beneath the piston 42 is thereby filled with the dispensing material. It will be noted that while the material is filling bore 38, as well as at other times, pressure from source 59 is also applied through tube 24 in passage 54 to the minor area on the back side of the piston. However, since this back area is materially smaller, the piston 42 rises upwardly and the bore 38 becomes filled. The difference in areas of the front and the back of piston 42 facilitates the employment of one source of air under pressure and eliminates additional valving etc. No control valve is used, but the spool valve is operated directly.

Once the cylinder comprising bore 38 is filled with material, it is ready to be operated to dispense a charge. This is accomplished by depressing button 18 forcing shaft 14, 40 carrying lands 58 and 60 to the right in FIG. 2 whereby port 72 is cut off and communication is provided between ports 70 and 74. Now, the pressure applied to the upper minor area on the back side of piston 42 is opposed only by atmospheric pressure and friction of the material, and the piston 42 is forced downwardly ejecting a charge of material through port 70, around shaft 62 of the spool valve and out port 74 and 12 to a desired receptacle, food peparation or the like. When piston 42 has thus dispensed the material, the shaft 14 is released, allowing the spool valve to return to its first position.

It will be seen that piston 42 can proceed no further downwardly than as permitted by any sleeves 92 as may be present. As mentioned above, various sized sleeves may be placed about shaft 44 for determining the quantity of material which is to be dispensed. When shaft 14 is released to its first position, the bore 38 is refilled with material, and the device is ready for another cycle of operation.

While I have shown and described a preferred embodiment of my invention, it will be apparent to those skilled in the art that many changes and modifications may be made without departing from my invention in its broader aspects. I, therefore, intend the appended claims to cover all such changes and modifications as fall within the true spirit and scope of my invention.

I claim:

1. Dispensing apparatus comprising:
   a unitary housing block provided with a bore forming a dispensing cylinder, and a dispensing exit port,
   a dispensing piston received in said bore, said piston having major and minor end areas in said bore,
   a second bore in said housing and a spool valve structure received therein continuously communicating with the first mentioned bore adjacent the major end of said dispensing piston,
   passageways in said housing block communicating with said second bore forming ports adapted to be opened and closed by said spool valve and communicating respectively with the source of material to be dispensed and said dispensing exit port, and means for applying air under pressure to the minor area of said dispensing piston and the material to be dispensed.

2. Dispensing apparatus comprising:

a first dispensing cylinder having a dispensing piston received therewithin and a first shaft joined to said piston and extending centrally of said cylinder and outwardly thereof, a three way spool valve comprising a second cylinder, and a pair of lands received therewithin and joined by a central shaft, said spool valve having first, second and third ports communicating with said second cylinder including a central port and two end ports disposed in spaced relation so that first and second positions of said spool valve alternately couple the central port to either one of the end ports, said central port communicating with the end of said first cylinder adjacent the major end of said dispensing piston opposite said first shaft, and the remaining ports respectively communicating with a source of material to be dispensed and providing a dispensing exit port, and means for applying air under pressure to the minor area behind said dispensing piston in said first cylinder around said first shaft as well as to the material to be dispensed.

3. The apparatus according to claim 2 including means cooperable with said first shaft for selectively limiting the stroke of said dispensing piston.

4. The apparatus according to claim 2 wherein the outer end of said first shaft is provided with a stop, and further including at least one sleeve received upon said first shaft between said stop and said first cylinder for limiting the stroke of said dispensing piston.

5. The apparatus according to claim 4 wherein said stop is removably securable to the end of said first shaft for facilitating the removal and insertion of one or more sleeves upon said first shaft.

6. Dispensing apparatus comprising:

a unitary housing block provided with first and second bores and a dispensing exit port, a dispensing piston received in a first of said bores and attached to a first shaft extending centrally outwardly of the first of said bores, a three way spool valve received in the second of said bores comprising a pair of lands joined by a second central shaft, and an operating shaft joined to one of said lands and extending centrally outwardly of the second of said bores, said spool valve being provided with first, second and third ports communicating with said second of said bores comprising a central port and two end ports disposed in spaced relation so that first and second positions of said spool valve alternately couple the central port to either one of the end ports, wherein the central port communicates with the inner end of the first of said bores, and the remaining ports communicate with a source of material to be dispensed and a dispensing exit port respectively, and means for applying air under pressure to the minor area behind said dispensing piston in the first of said bores around said first shaft.

7. The apparatus according to claim 6 further including a tank for material to be dispensed, a connection from said tank to said central port, and means for applying air under pressure in said tank in common with the means for applying air under pressure behind said dispensing piston.

8. The apparatus according to claim 6 wherein the outer end of the first of said bores is provided with a sealing gland through which said first shaft passes.

9. The apparatus according to claim 8 wherein the outer end of said first shaft is provided with a stop, and further including at least one sleeve received upon said first shaft between said stop and said gland for limiting the stroke of said dispensing piston.

10. The apparatus according to claim 9 wherein said stop is removably securable to the end of said first shaft for facilitating the removal and insertion of one or more sleeves upon said first shaft.

11. The apparatus according to claim 6 wherein the outer end of the second of said bores is provided with a stop and the outer end of said second central shaft is provided with an operating button, said apparatus further including a spring received upon said second central shaft between said button and the last mentioned stop for normally returning said three way spool valve to a position providing communication between said central port and the remaining port communicating with a source of material.

12. The apparatus according to claim 6 wherein said bores are disposed in substantially right angular relation to one another with said second of said bores being substantially parallel to the bottom of said housing block, said exit port extending from the bottom of said housing block whereby said three way spool valve may be operated in a horizontal fashion for the vertical dispensing of material from said exit port.

* * * * *